UNITED STATES PATENT OFFICE.

OBADIAH MARLAND AND JOHN C. CROSMAN, OF BOSTON, MASSACHUSETTS.

IMPROVEMENT IN THE MANUFACTURE OF WHISKY.

Specification forming part of Letters Patent No. 157,408, dated December 1, 1874; application filed July 15, 1874.

*To all whom it may concern:*

Be it known that we, OBADIAH MARLAND and JOHN C. CROSMAN, of Boston, county of Suffolk and State of Massachusetts, have invented an Improved Mode of Making Whisky, of which the following is a specification:

The object of this invention is to make whisky of great purity, possessing the desirable and valuable qualities for medicinal administration, which, in whisky as commonly made, have heretofore been acquired, wholly or partially, through the influences of age, or "ripening" by years of time, or by some subsequent and expensive treatment.

It is well known that whisky as ordinarily made, and before it has been laid away to "ripen," possesses certain highly-objectionable qualities which render it unfit for use as a medicinal agent, and that such objectionable qualities are supposed to be communicated to it by the crude nitrogenous matter of which the grain is in part composed; but from whatever cause those objectionable qualities may arise, and without pretending to know or to state from what they do arise, we have found that subjecting the grain to the action of heat at a comparatively high temperature for a proper length of time prior to fermenting it, the said objectionable qualities do not make their appearance in the distillate; but that, on the contrary, the whisky as it comes directly from the still is very fine in flavor and of remarkable purity.

The nature of this invention consists in making whisky from grain, or any other matter containing starch, which has been subjected, as hereinafter more particularly stated, to the action of heat at a temperature above 212° Fahrenheit, and between the said temperature of 212° Fahrenheit and any higher degree of temperature below that at which the matter treated will become scorched, or charred, or injured in flavor, and keeping said grain exposed to the action of said temperature for a sufficient length of time to effect the desired change in its flavor and general character.

In carrying out our invention, we first select a good quality of grain or other matter, and place it in a cylindrical oven similar to that used for converting starch into British gum or dextrine by the dry process; but, preferably, instead of stirring the grain while under treatment by the projecting arms attached to the revolving shaft of said oven, we affix a hollow, perforated, or wire-cloth cylinder on said revolving shaft, so that said cylinder will revolve with said shaft, and thus agitate the grain more perfectly than said projecting arms. Having charged the cylinder, filling it about half-full, we raise the heat of said oven to a degree sufficient to drive off all the water in the matter under treatment, and as soon as all the water is expelled we stop the steam-vent of said oven, and then raise the temperature to the desired degree, and maintain the temperature at said desired degree for the length of time desired, according to the character of the matter under treatment. Rye, wheat, or barley, and similar small grain will be permeated by the heat and sufficiently treated in about one-half the time required for maize or Indian corn. The time required, however, is not arbitrary, so that the matter treated is thoroughly permeated by the heat of the desired degree; neither is the degree of heat arbitrary, so that the matter under treatment is not scorched, nor charred, nor injured in flavor. We have found as low a temperature as 240° Fahrenheit maintained for about two hours and a half to afford tolerably satisfactory results; but with our present experience we prefer to treat maize or Indian corn for about ninety (90) minutes at a temperature of about 290° Fahrenheit, and to treat small grains, such as rye or wheat, for about forty-five (45) minutes at a temperature of about 310° Fahrenheit. The treatment being completed we remove the treated matter from the oven, and to arrest its tendency to spontaneous combustion we place it in a receiver provided with a perforated bottom, and with an air-pump force or draw through the heated mass a current of air sufficient to cool the entire charge; or it may be cooled on a floor by turning it over with a hoe or shovel. We now proceed by grinding the treated matter into flour, then mashing, fermenting, and distilling by any of the well-known and approved methoths; but we prefer to use distilled water in making the mash, and also prefer to use a copper still lined with tin or porcelain for distilling. If the water driven from the grain while in the oven is not restored before flouring, a sufficient quantity of water must be added to the usual amount used in making the mash, to supply the place of the water expelled from the grain while in the oven. When it is desired to treat the meal or flour of grain to the temperature herein stated for the purpose of making whisky we use the projecting arms attached to the revolving shaft of the oven, instead of the wire-cloth cylinder, for the purpose of agitating said meal or flour while under treatment.

There are several devices well adapted for converting starch into British gum or dextrine by the dry process, either of which may be successfully used for the treatment of grain for making whisky in accordance with our invention; but, for economy and perfection of work, we much prefer the cylindrical oven with revolving shaft, hereinbefore referred to.

Grain in quantities of two or three hundred pounds or more, when treated to the comparatively high degrees of heat herein stated, and for the length of time stated, will, from some unknown cause, after it is removed from the oven, often take upon itself a much higher degree of heat than that to which it has been treated, and will take fire and be reduced to coal and ashes; and it will sometimes, while under treatment in the oven, take upon itself a much higher degree of heat than that to which it is subjected in the oven, and thus become charred. We therefore find it best to carefully watch the matter while under treatment, and to stop said treatment before said grain takes on such local, self-generated heat. We determine the time or duration of the treatment, and the degree of heat desired, partly by the peculiar aroma arising from the matter under treatment, and partly by the peculiar color of said matter in connection with its peculiar pulverable character. When once recognized said peculiar aroma can always afterward be easily distinguished, and the same remark is true in regard to the peculiar color of the treated matter and its pulverable character.

We prefer to grind the treated matter into flour within a day or two after it has become cool, and to make the mash within a few hours after flouring, for the purpose of preventing or lessening the escape of the aroma.

The conversion of starch into British gum or dextrine at the temperature herein named is comparatively slow, and we prefer to stop the treatment as soon as the grain is thoroughly permeated by the heat of 290° to 310° Fahrenheit, and while the starch in said grain is yet only partially converted into British gum or dextrine.

When grain is treated substantially as herein described it is most thoroughly purified, a change in its constituent elements takes place, new products are formed, objectionable qualities are eliminated or so changed as not to exhibit themselves in the distilled spirits, as they uniformly do in the spirits produced from raw grain in the ordinary way, a new and very pleasant fragrance is imparted to the matter treated, the starch in the grain is partially converted into British gum or dextrine, and an entirely new and highly-agreeable flavor, of remarkably pure and delicate character, is communicated to the spirits produced therefrom.

By treating grain with steam at the temperature herein named similar effects might be obtained, but would be attended with greater expense.

What we claim as our invention, and desire to secure by Letters Patent, is—

The process of preparing grain for whisky-distilling, consisting in subjecting the same to a temperature above 212° Fahrenheit, but below that at which the matter treated will be scorched, and thus injured in flavor, substantially as described, for the purpose of producing whisky of excellent purity and flavor without "ageing," or ripening, or keeping a long time on hand.

OBADIAH MARLAND.
JOHN C. CROSMAN.

Witnesses:
J. B. McGEARY,
H. H. BARNES.